J. S. NICHOLS, S. T. BILLINGSLY, AND H. E. SCOGGINS.
WHEEL RIM.
APPLICATION FILED SEPT. 21, 1920.

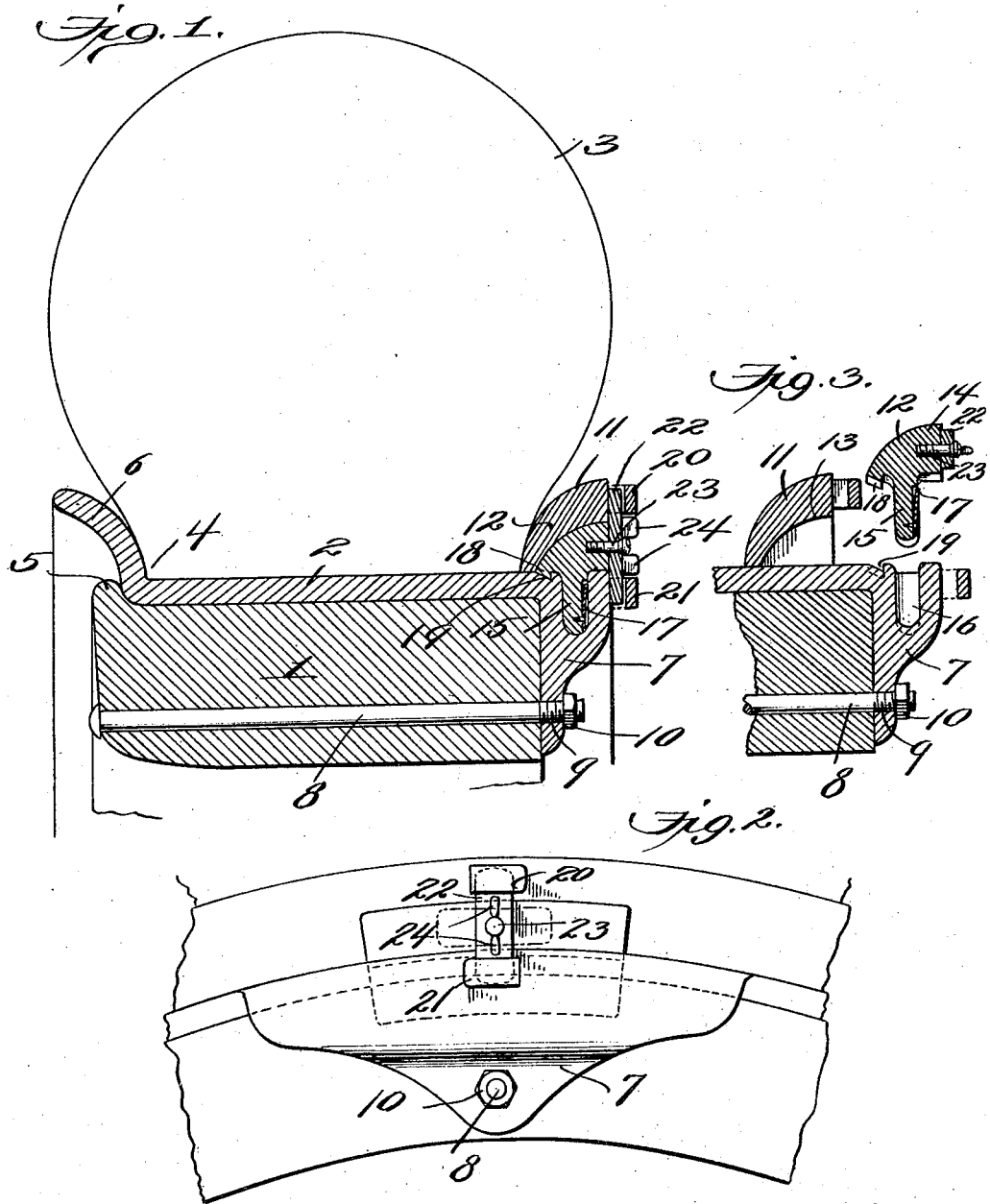

1,419,889.

Patented June 13, 1922.
2 SHEETS—SHEET 2.

UNITED STATES PATENT OFFICE.

JAMES S. NICHOLS, STERLING T. BILLINGSLY, AND HOWARD EVAN SCOGGINS, OF ATLANTA, GEORGIA.

WHEEL RIM.

1,419,889.  Specification of Letters Patent.  Patented June 13, 1922.

Application filed September 21, 1920. Serial No. 411,789.

*To all whom it may concern:*

Be it known that we, JAMES S. NICHOLS, STERLING T. BILLINGSLY, and HOWARD EVAN SCOGGINS, citizens of the United States, residing at Atlanta, in the county of Fulton and State of Georgia, have invented new and useful Improvements in Wheel Rims, of which the following is a specification.

The present invention relates to improvements in wheel rims and more particularly to rims of the kind adapted for mounting pneumatic tires upon wheels of automobiles and similar vehicles. The primary objects of the invention are, to provide a novel and improved rim of this type whereby the tire may be easily and quickly removed from the rim and replaced thereon, without requiring stretching of the tire over a flange or other projecting part of the rim, and also without requiring the use of special tools, thus enabling the changing of tires to be accomplished with equal facility, either while the rim is mounted on the wheel, or while the rim is removed therefrom, to provide novel and improved means for mounting the rim upon the wheel, whereby the rim may be easily and quickly mounted and securely fastened on the wheel or unfastened or removed, the rim fastening devices being of improved construction, so that, when fastened, all looseness between the rim and the wheel is eliminated, to provide novel and improved means for fastening the tire upon the rim, such fastening devices being capable of manipulation manually and with facility, avoiding the necessity of using special tools, and to otherwise remedy the difficulties which exist with so-called demountable and separable rims using wedges which loosen and locking rings which become bent or distorted and are then difficult to handle.

To these and other ends, the invention consists in certain improvements and combinations and arrangements of parts, all as will be hereinafter more fully described, the features of novelty being pointed out particularly in the claims at the end of the specification.

In the accompanying drawings—

Figure 1 represents a cross section through a wheel felly and a rim mounted thereon and constructed in accordance with the preferred embodiment of the present invention;

Figure 2 represents a side elevation of the portion of the felly and rim as illustrated in Figure 1;

Figure 3 represents a transverse section through the righthand side of the rim shown in Figure 1, illustrating the manner in which the tire retaining flange is released;

Similar parts are designated by the same reference characters in the several views.

Figure 4:
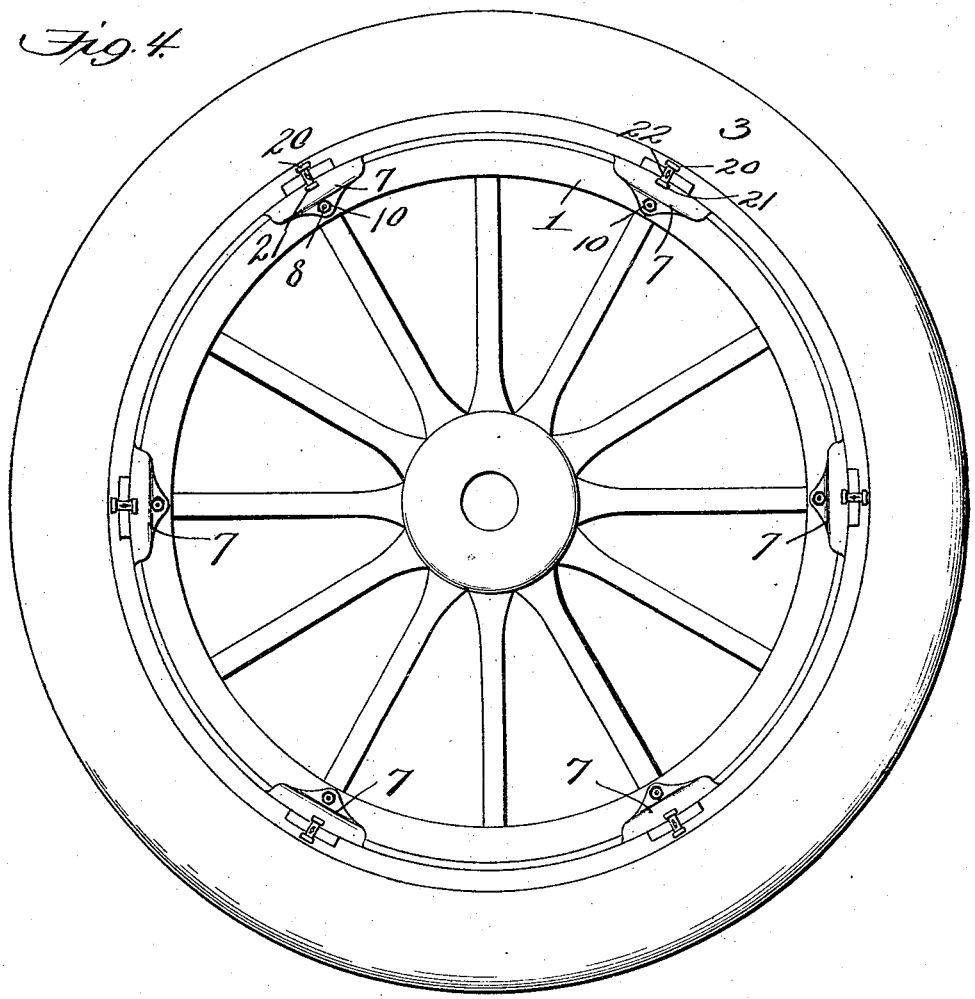
Figure 4 is a side elevation of a complete wheel equipped with a rim embodying the present invention.
Figure 5:
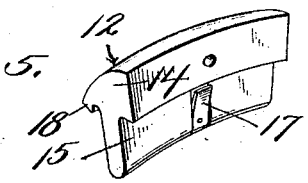
Figure 5 is a detail perspective view of one of the rim locking keys.

The present invention provides a rim which is adapted for use generally in connection with vehicle wheels of various kinds for the mounting of tires of various kinds thereon, it being applicable not only to the ordinary conventional type of wooden wheels used generally upon automobiles, but is also applicable, as to some or all of its features, to wire wheels and disk wheels. The rim in its preferred embodiment is shown in the accompanying drawings and will be hereinafter described in detail. It is to be understood, however, that the invention is not restricted to the precise construction shown, as equivalent constructions are contemplated and these will be included within the scope of the claims.

It will also be understood that while the rim in its preferred form is of the combined demountable and separable type, the demountable and separable features of the invention may be used separately, although it is most advantageous to use these features of the invention in combination, as will herein appear.

In the present instance, 1 designates the felly of a vehicle wheel which, as illustrated, forms part of a wooden automobile wheel of the kind generally used, 2 represents the body of the rim and 3 represents the tire which may be of any of the conventional types generally used, the tire having beads 4 which may be either of the straight side type, as shown, or of the clincher type, these beads engaging the rim and thus securing the tire thereto.

In the present instance, the rim is demountably applied to the wheel so that the rim, when not applied to the wheel, may carry thereon an inflated tire and the rim and tire may be applied as a unit to the wheel and secured thereon, the rim and tire being similarly removable as a unit from the wheel to permit replacement. To this end, the wheel felly is provided at one edge at its outer periphery with an outwardly projecting shoulder, rib or projection 5, which preferably extends continuously around the felly, and may be formed as a part of the usual metal felly band. The rim 2 comprises a substantially cylindrical body portion over which fit the beads 4 of the tire and is adapted to slip over and to fit upon the outer circumference of the felly or the felly band thereon, one edge of this body portion of the rim being adapted to abut against the shoulder 5, in order to locate the rim properly in the plane of the wheel and to sustain the side thrust in one direction between the wheel and the rim. The edge of the rim adjacent to the part thereof which is adapted to cooperate with the shoulder 5 on the felly, is provided with a tire retaining flange 6, which flange is preferably fixed to or formed integrally with the body of the rim. As shown, this fixed flange is rounded or curved outwardly to adapt it to a tire having straight-sided beads, but it will be understood that this flange may be otherwise formed to adapt it to tires having beads of other types. The opposite edge of the rim is provided at suitable intervals spaced circumferentially thereof with plate-like lugs 7 which extend inwardly or toward the axis of the rim, and these lugs are shaped and otherwise adapted to seat firmly and immovably against the adjacent side of the wheel felly 1 when the opposite edge of the rim abuts against the peripheral shoulder 5 at the opposite side of the felly. It will be understood that the rim, either with or without a tire thereon, is applied to the wheel felly from the righthand side (Figure 1), it being pushed over the felly toward the left in said figure until the lefthand edge of the rim reaches the peripheral shoulder 5 and the several circumferentially spaced and inturned lugs 7 come up against the righthand side of the felly, these lugs being integral with or otherwise rigidly fixed to the body of the rim. The rim is fastened to the wheel felly by a suitable number of bolts 8, which extend through the felly, preferably at intervals corresponding to the circumferential spacing of the lugs 7, the bolts preferably fitting tightly into the felly and the lugs 7 having apertures 9 therein which the threaded ends of the bolts enter, when the rim is brought into position on the felly, the threaded ends of the bolts projecting a suitable distance beyond the lugs, and nuts 10 may be applied to the threaded ends of the bolts, these nuts, when tightened, forcing the rim to its final seat upon the felly with one edge of the rim bearing firmly against the peripheral flange 5 and the lugs 7 seating firmly and solidly against the adjacent side of the felly. By mounting the rim in this manner upon the felly, a firm seating for the rim is insured and all looseness or play between the rim and felly is taken up or eliminated, the lugs 7 having a firm clamping action against the adjacent sides of the felly.

The tire, according to the present invention, may be applied to and removed from the rim, without requiring stretching of the tire over a flange or other projecting part of the rim and without requiring collapsing of the rim, or the use of special tools. To accomplish these results, the side of the rim opposite to the flange 6 is formed without a flange or other projecting part, this side of the rim being of no greater diameter than the body portion of the rim, so that the beads of the tire may easily pass over this edge of the rim while being applied to or removed from the rim. The tire is retained upon the rim by a flange 11 which is complemental to the fixed flange 6, but the flange 11 is formed separately from the body of the rim and is removable and replaceable with respect thereto. This flange 11, like the flange 6, may also be shaped to accommodate tires having beads of different types. In the preferred embodiment of the invention, the detachable or separable tire retaining flange 11 is fastened in its proper position on the rim, after the tire has been applied thereto, by a set of locking keys 12, which are preferably of a number corresponding to the number of rim securing lugs 7, and these keys are preferably mounted in and housed by the rim securing lugs. Preferably and as shown, the detachable flange 11 is concave or undercut at its outer side, as at 13, so that when this flange occupies its normal tire retaining position on the rim, it will overhang the rim securing lugs 7, and the rim fastening keys 12, which are housed by the lugs 7, are engaged by the flange 11 and the latter serves to retain the keys in position to prevent outward displacement of the flange. Preferably and as shown, each flange locking key comprises a head 14 which is adapted to seat against the outer periphery of the rim and to fit into the undercut or overhanging portion at the outer side of the flange 11, and the key also has a tang or shank 15 adapted to fit into a slot-like socket or seat 16 formed in the respective rim fastening lug 7. These keys are inserted into their respective sockets or seats while the rim retaining flange 11 is pushed inwardly or toward the opposite flange 6, as shown in Figure 3, and in order to prevent dropping of these keys from their sockets, prior to the locking of these keys by the flange 11, each key may be provided with a friction spring or an equivalent friction device 17, which, when the key is inserted into its socket, will retain the key therein, thus preventing the keys inserted at the underside of the wheel from dropping from their sockets by gravity. When the flange 11 is pulled or otherwise caused to move outwardly to its normal tire retaining position, the overhanging portion of this flange will move over the heads of the keys until the outward movement of this flange is arrested by the projecting heads of the keys, the heads of the keys being then firmly engaged by the overhanging portion of the flange so that the keys are locked in their sockets. Inflation of the tire forces the flange 11 outwardly so that this flange 11 will be normally held in a position to lock the keys in place. In order to assist the keys in sustaining the outward pressure exerted thereon by the pressure of the tire bead against the flange 11, each key may be provided with a hook 18 and the outer periphery of the rim may be provided with a similar notch 19, into which the hook may engage, so that this hook will act to sustain either part or all of the outward pressure exerted by the tire upon the flange 11.

While the tire is inflated, the flange 11, of course, will be continuously forced outwardly with sufficient pressure to maintain the keys in locking position. In order to prevent disengagement of these keys from their sockets when the tire on the rim is not inflated, the flange 11 and the lugs 7 may be provided with reversely positioned retaining lugs 20 and 21 respectively, and each key may be provided with a locking bar 22 which may be pivoted thereon, as by a screw 23, and provided with wings or finger-pieces 24, this locking bar being swung into the full line position shown in Figures 1 and 2, in order to retain the flange 11, the keys 12 and lugs 7 in locked relation, these bars 22 being swung into the dotted line position shown in Figure 2 and clear of the lugs 20 and 21, when it is desired to unlock the keys preparatory to the removal of the tire from the rim.

The present invention provides a rim on which the tire can be easily and quickly applied and removed without the necessity of stretching or forcing the tire over a flange or any other projecting part of the rim, and hence injury to the tire or the beads is avoided and the changing of the tire can be accomplished by the hands. The fastening devices for the rim also lock the tire securely upon the rim, although they can be easily and quickly released to permit removal of the tire from the rim, while the tire is deflated, inflation of the tire serving to lock these fastening devices in secured condition. The rim is also mounted on and secured to the wheel in an improved manner, whereby looseness between the rim and wheel, which is usually present or develops when the usual wedges are employed, is avoided, and the rim is of increased strength and rigidity as the rim and the tire retaining flanges thereon are non-split or continuous.

We claim as our invention:—

1. A wheel rim comprising a body having a tire-retaining flange at one edge and flangeless at its opposite edge to provide an unobstructed passage for the tire, a separate tire-retaining flange adapted to fit over the flange-less edge of the rim, and a set of circumferentially-spaced keys movable radially inwardly in a plane parallel to the plane of the rim to cooperate with said separate flange to secure the latter in operative position on the rim, said separate flange when in operative position on the rim acting to lock said keys in securing position.

2. A wheel rim comprising a body of a size to receive the beads of a pneumatic tire and having flanges at its opposite edges one of which flanges is removable to permit application and removal of a tire, and securing keys removably fitting the rim radially in a common plane at the outer side of the removable flange, the removable flange overhanging said keys to lock them in securing position when said flange occupies its normal operative position on the rim.

3. A wheel rim comprising a body of substantially cylindrical form to receive a tire, and tire-retaining flanges for the opposite edges of said body, one of said flanges being removable to permit unobstructed application and removal of a tire, the body at the outer side of said removable flange having a set of circumferentially-spaced, inwardly extending sockets, and keys having portions to removably fit into said sockets by inward radial movements in a common plane and having heads to project at the outer side of the removable flange to secure the latter in tire-retaining position.

4. A wheel rim comprising a body having a tire-retaining flange at one side and open at its opposite side to permit unobstructed application and removal of a tire, the open side of the rim having a set of circumferentially-spaced radial sockets lying in a common plane, a removable tire-retaining flange to fit the open side of the rim, and a set of circumferentially - spaced, radially removable keys having straight shanks to fit into the respective sockets in the rim and having projecting heads to cooperate with the outer side of the removable flange to prevent outward movement thereof.

5. A wheel rim comprising a body having a tire-retaining flange at one side and open at its opposite side to receive a tire, a removable tire-retaining rim to fit upon the open side of the rim, and a set of circumferentially-spaced keys having straight shanks to fit into the rim and having projecting portions to cooperate with the outer side of the removable flange to prevent outward movement thereof, said removable flange when in operative position overhanging the projecting portions of the keys and thus locking the latter in place.

6. A wheel rim comprising a tire-receiving body having a retaining flange at one side and open at the opposite side for the passage of a tire onto and off of the rim, said body having adjacent to its open side a set of circumferentially-spaced inwardly-extending sockets, a removable flange to fit upon the open side of the rim and having its outer side undercut, and a set of keys having portions to fit into said sockets in the rim, and heads which project beyond the body of the rim and cooperate with the removable flange at its outer side to prevent outward movement of said flange, the heads of the keys being confined in the undercut outer side of the removable flange when the latter is in operative position.

7. A wheel rim having an open side to permit the unobstructed application and removal of a tire and having a set of circumferentially-spaced sockets at said open side, a removable tire-retaining flange to fit upon said open side of the rim, and a set of locking keys having shanks to fit into said sockets and projecting portions to engage the outer side of said flange, said keys also having hooks to cooperate with the outer periphery of the rim and thus sustain the outward thrust exerted on the keys by said flange.

8. A wheel rim open and flange-less at one side to receive a tire and formed with circumferentially-spaced sockets, a removable tire-retaining flange to fit upon the rim, keys to fit said sockets and to cooperate with the outer side of said flange to prevent outward movement of said flange, the latter when in its normal position on the rim, cooperating with said keys to lock them in said sockets and releasing said keys when said flange is moved inwardly, and releasable means for preventing inward movement of said flange.

9. A wheel rim open at one side to permit the unobstructed application and removal of a tire and having a set of circumferentially-spaced substantially radial sockets, a removable tire-retaining flange to fit upon said open side of the rim, and a set of keys for locking said flange, each key having a tang to removably fit into a socket in the rim and a friction device operative between a wall of the socket and the tang of the key for retaining the key in its socket.

10. A wheel rim comprising a tire-receiving body to demountably fit on the periphery of the wheel felly and having a tire-retaining flange at one side and open at its opposite side to permit unobstructed application and removal of a tire, the rim having at its open side a set of circumferentially-spaced inwardly-turned lugs which are rigid with the rim and are adapted to abut against a side of the wheel felly, said lugs being provided at their outer circumferences with radially inwardly extending sockets, means cooperating with the wheel felly and said lugs for forcing said lugs against the felly, a detachable tire-retaining flange to fit the open side of the rim and keys having shanks removably fitting into the sockets in said lugs for locking said detachable flange on the rim.

In testimony whereof we have hereunto set our hands in presence of two subscribing witnesses.

JAMES S. NICHOLS.
STERLING T. BILLINGSLY.
HOWARD EVAN SCOGGINS.

Witnesses:
OTEY McCLELLAN,
VANNIE PAYNE.